(12) United States Patent
Ikeda

(10) Patent No.: US 6,172,729 B1
(45) Date of Patent: Jan. 9, 2001

(54) LIQUID CRYSTAL DISPLAY DEVICE OF DELTA ARRANGEMENT HAVING PIXEL OPENINGS WITH SIDES OBLIQUE TO SCAN LINES

(75) Inventor: Munehiro Ikeda, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/311,354

(22) Filed: May 13, 1999

(30) Foreign Application Priority Data

May 26, 1998 (JP) .................................................. 10-143811

(51) Int. Cl.[7] .................................................. G02F 1/1343
(52) U.S. Cl. .............................. 349/145; 349/196; 349/39
(58) Field of Search .............................. 349/39, 139, 145, 349/146

(56) References Cited

U.S. PATENT DOCUMENTS

| | | | | |
|---|---|---|---|---|
| 5,535,028 | * | 7/1996 | Bae et al. ............................... | 349/145 |
| 5,760,857 | * | 6/1998 | Yanagawa et al. .................... | 349/145 |
| 5,831,708 | * | 11/1998 | Hiraishi et al. ........................ | 349/39 |
| 5,946,066 | * | 8/1999 | Lee et al. ............................... | 349/145 |

FOREIGN PATENT DOCUMENTS

| | | | | |
|---|---|---|---|---|
| 5-98412 | * | 11/1993 | (JP) . | |
| 6-11734 | * | 1/1994 | (JP) . | |
| 6-289423 | * | 10/1994 | (JP) ................................ | G02F/1/136 |
| 6-308537 | * | 11/1994 | (JP) ................................ | G02F/1/136 |
| 8-101400 | * | 4/1996 | (JP) . | |
| 8-87025 | * | 4/1996 | (JP) . | |
| 9-22026 | * | 1/1997 | (JP) ................................ | G02F/1/136 |

* cited by examiner

*Primary Examiner*—William L. Sikes
*Assistant Examiner*—Toan Ton
(74) *Attorney, Agent, or Firm*—Foley & Lardner

(57) ABSTRACT

According to an aspect of the present invention, there is provided a liquid crystal display device of a delta type pixel arrangement, which comprises: a plurality of scan lines formed on a substrate and extending in a horizontal direction; a plurality of signal lines each intersecting with each of the plurality of scan lines substantially at right angles at a intersection region; a plurality of thin film transistors each having a drain electrode and a source electrode arranged at the intersection region in a direction substantially having right angles with each of the plurality of scan lines; and a plurality of pixel electrodes arranged in a matrix formed of regions divided out by the plurality of scan lines and the plurality of signal lines, wherein a part in a portion disposed between adjoining two of the plurality of scan lines and taken from each of the plurality of signal lines is arranged in a direction having a oblique angle with each of the plurality of scan lines.

3 Claims, 7 Drawing Sheets

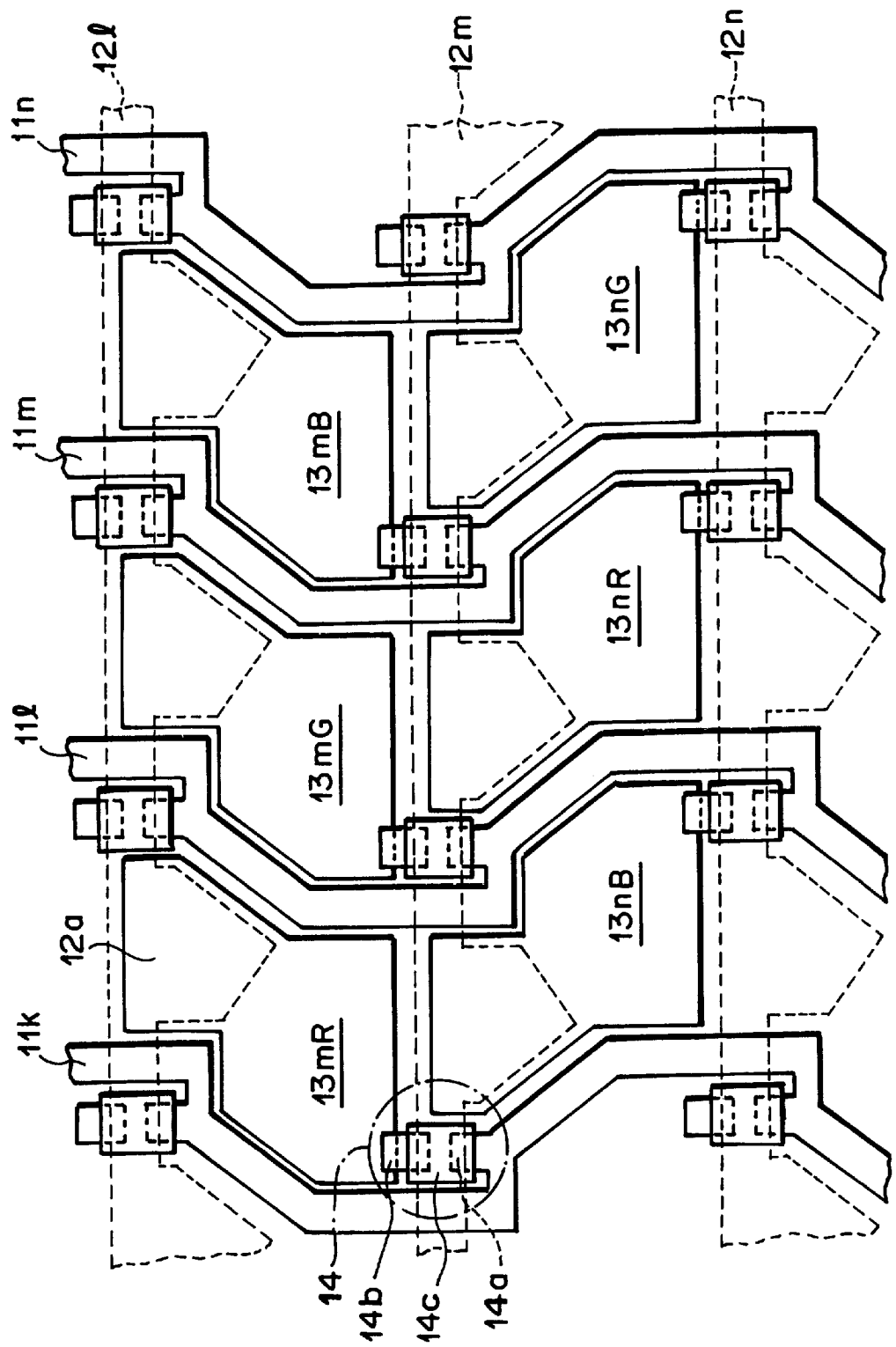

LIQUID CRYSTAL DISPLAY DEVICE OF DELTA ARRANGEMENT HAVING PIXEL OPENINGS WITH SIDES OBLIQUE TO SCAN LINES

BACKGROUND OF THE INVENTION

1. Field of the Invention

The present invention relates to a liquid crystal display device and more particularly, to a liquid crystal display device of a delta type pixel arrangement.

2. Description of the Prior Art

The liquid crystal display device is remarked as a thin and low power consuming display device replacing the conventional cathode ray tube. Particularly, the so-called active matrix type liquid crystal display device which employs as a driving element a non-linear element such as a TFT (Thin Film Transistor) and a MIM (Metal Insulator Metal) is specially remarked because of the beautiful display thereof.

In the liquid crystal display device, a stripe type and a delta type (or triangular type) are mainly employed as pixel arrangements. The pixel arrangements of the both types will be explained with reference to FIGS. 9 and 10. FIG. 9 is a diagram showing the stripe type pixel arrangement and FIG. 10 is a diagram showing the delta type pixel arrangement.

First, in the stripe type pixel arrangement as shown in FIG. 9, there is a configuration in which pixels 53 of R, G and B corresponding to colors of red, green and blue in color layers applied to the opposed substrate are arranged linearly in the horizontal and vertical directions. A set of three colors of R, G and B forms a dot 54.

Next, in the delta type pixel arrangement as shown in FIG. 10, there is a configuration in which pixels 53 of R, G and B corresponding to red, green and blue on the opposed substrate are arranged linearly in the horizontal direction (row direction) in the figure the as same as those in the stripe type, but in the vertical direction (column direction) in the figure, pixels 53 are shifted by a half pitch. Therefore, dot 54 consisting of the set of three colors of R, G and B is arranged in the form of a nest for the row direction. Therefore, the delta type pixel arrangement enables to provide a beautiful display without a remarkable zigzag in inclined lines and curves and is employed widely for the use of displaying particularly a natural image and the like.

Further, in the liquid crystal display device, it is important to prepare a sufficient auxiliary capacitance for sustaining an electric field applied across the liquid crystal layer in order to realize a high contrast and beautiful display.

Auxiliary capacitance is classified into two types in accordance with circuit configurations. Referring to FIGS. 3 and 4 which show equivalent circuits of one pixel, auxiliary capacitance 39 is formed between pixel electrode 13 and pre-stage scan line 12 in a case shown in FIG. 3 (this is referred to as a gate storage type). Alternatively, auxiliary capacitance 39 is also formed between pixel electrode 13 and auxiliary capacitance electrode 15 connected electrically with the opposed electrode in another case shown in FIG. 4 (this is referred to as a common storage type). The both cases have the following features. Auxiliary capacitance 39 is formed in parallel with liquid crystal capacitance 37 in any of the types.

FIGS. 5A and 5B are a diagram for explaining a conventional gate storage type liquid crystal display device of the delta type arrangement. FIG. 5A is a diagram showing a plan view of a substrate, and FIG. 5B is a diagram showing a shape of an opening.

The operation of the liquid crystal display device will be explained with reference to FIGS. 5A and 5B. The present device obtains a display by turning on a TFT with a scan signal given to scan line 12, that is, making conduction between drain electrode 14a and source electrode 14b of TFT 14 through channel 14c disposed between the both electrodes, at the moment charging up a liquid crystal capacitance between pixel electrode 13 and an opposed electrode (not depicted) and an auxiliary capacitance formed at a part between pixel electrode 13 and pre-scan line 12 with a display signal given to signal line 11, and sustaining the charges after turning off TFT 14.

Signal line 11 is bent at right angles in order to detour pixel electrode 13, and a portion shown by detour 11a of the signal line is disposed in parallel with scan line 12. Thus, a length of a region for forming the auxiliary capacitance, that is, an adjacent region 51 between pixel electrode 13mR and pre-stage scan line 121 is extremely shortened relative to a transverse width of pixel 13mR by affection of detour 11a of the signal line. Therefore, in order to form a sufficient auxiliary capacitance at auxiliary capacitance section 12a, it is necessary to extend scan line 121 toward scan line 12m in the next stage so as to invade an opening (transparent region).

Next, a conventional liquid crystal display device of the common storage type will be explained. FIGS. 6A and 6B are diagrams for explaining the conventional common storage type liquid crystal display device of the delta type arrangement. FIG. 6A is a diagram showing a plan view of a substrate, and FIG. 6B is a diagram showing a shape of an opening.

The operation of the liquid crystal display device will be explained with reference to FIGS. 6A and 6B. The mechanism of the operation is the same as that of the gate storage type liquid crystal display device, but the common storage type liquid crystal display device includes an auxiliary capacitance section 15a formed between pixel electrode 13 and auxiliary capacitance line 15. Auxiliary capacitance line 15 is formed simultaneously with scan line 12, and is connected electrically to the opposed substrate (not depicted). In the common storage type, there is no limitation to the region for forming the auxiliary capacitance by the bending of the signal line as practiced in the gate storage type.

However, auxiliary capacitance line 15 is formed on the same layer as that of the scan line. Therefore, in order to avoid a short circuit defect, it is desirable to extend a distance between scan line 11 and auxiliary capacitance line 15 as long as possible. From this reason, auxiliary capacitance line 15n is usually formed close to the medium portion between pre-stage scan line 12m and scan line 12n as shown in FIG. 6A.

In the liquid crystal display device of which pixel arrangement forms the delta type, there are the following disadvantages with respect to each of the gate storage type and common storage type.

Namely, with respect the gate storage type, as shown in FIG. 5A, signal line 11 is bent at right angles in order to go round pixel electrode 13, and the part shown by detour 11a of the signal line is arranged in parallel to scan line 12. Therefore, in order to form a sufficient auxiliary capacitance at auxiliary capacitance section 12a, it is necessary to extend scan line 121 toward scan line 12m in the next stage so as to invade opening 52 (transparent region). As the result, there is a disadvantage that a pixel opening shape is extremely disturbed, whereby the beautiful display quality which is a feature of the delta type arrangement is deteriorated. The disturbance to the shape of opening 52 is remarkable particularly in a fine liquid crystal display device in which the width of the line is larger relatively to the size of pixel 53 and opening 52 is shortened as the result.

In addition, as signal line 11 is arranged to bend at right angles, a total wiring length increases relative to that in the case where signal line 11 is disposed linearly, and a wiring resistance increases. The increase of the wiring resistance causes a disadvantage to delay the display signal.

In the gate storage type, a part of the auxiliary capacitance is formed on the scan line which is originally an opaque section. To the contrary, in the common storage type, because the whole auxiliary capacitance is formed on the region which has original opening 52, there is a disadvantage that the opening is extremely reduced. Further, in the common storage type, auxiliary capacitance line 15 is formed on the same layer as that of the scan line, which may cause a short circuit defect. In order to avoid the short circuit defect, it is desirable to extend a distance between scan line 11 and auxiliary capacitance line 15 as long as possible. Thus, auxiliary capacitance line 15n is usually formed close to the medium portion between pre-stage scan line 12m and scan line 12n. Therefore, there is a disadvantage that pixel opening 52 is divided into upper portion and lower portion by auxiliary capacitance line 15 and the shape of pixel opening 52 is extremely disturbed similar to that shown in FIG. 5A.

In addition, auxiliary capacitance line 15 intersects signal line 11 at intersection region 15b between the auxiliary capacitance line and the signal line to form an electrostatic capacity between signal line 11 and auxiliary capacitance line 15. Thus, there is also a disadvantage that there is caused the electrostatic capacity which becomes a load for the signal line delaying the display signal.

As explained above, in the liquid crystal display device, it is required to form large and smooth openings 52 of the pixel electrode 13 and in addition, to ensure sufficient capacitance of auxiliary capacitance 12. As examples of means for meeting the requirement, JPA 5-297412 discloses a method for forming the auxiliary capacitance at a periphery of the pixel electrode and JPA 8-87025 discloses a method for increasing the opening of the pixel electrode by miniaturizing the thin film transistor by adapting a self alignment structure. But there is a disadvantage in the examples that the manufacture is difficult.

Further, for the sake of preventing the disturbance of the opening shape, it is also possible to form auxiliary capacitance line 15 with a transparent conductive material such as ITO. However, if scan line 12 is made of metal, the product cost will increase undesirably because auxiliary capacitance line 15 and scan line 12 can not be formed simultaneously. It has also been considered to make scan line 12 with the transparent conductive material including ITO and form it simultaneously with auxiliary capacitance line 15. However, this is not practical because ITO has an extremely higher resistance than metals.

SUMMARY OF THE INVENTION

In order to overcome the aforementioned disadvantages, the present invention has made and accordingly, has an object to provide a liquid crystal display device of the delta type pixel arrangement having a pixel structure which enables to ensure a sufficient auxiliary capacitance without disturbing a pixel opening shape, to minimize a signal line delay, and to ensure a higher opening rate.

According to an aspect of the present invention, there is provided a liquid crystal display device of a delta type pixel arrangement, which comprises: a plurality of scan lines formed on a substrate and extending in a horizontal direction; a plurality of signal lines each intersecting with each of the plurality of scan lines substantially at right angles at a intersection region, a plurality of thin film transistors each having a drain electrode and a source electrode arranged at the intersection region in a direction substantially having right angles with each of the plurality of scan lines; and a plurality of pixel electrodes arranged in a matrix formed of regions divided out by the plurality of scan lines and the plurality of signal lines, wherein a part in a portion disposed between adjoining two of the plurality of scan lines and taken from each of the plurality of signal lines is arranged in a direction having a oblique angle with each of the plurality of scan lines.

In the liquid crystal display device of a delta type pixel arrangement, an opening of each of the pixel electrodes may be defined by two first lines substantially parallel to each of the plurality of scan lines, two second lines substantially having right angles with each of the plurality of scan lines, and two third lines each having a oblique angle with each of the plurality of scan lines, and each end of one of first lines may be connected with an end of each of the second lines.

In the liquid crystal display device of a delta type pixel arrangement, an auxiliary capacitance may be formed in a section where each of the plurality of pixel electrodes overlaps each of the plurality of scan lines, the auxiliary capacitance may be defined by a fourth line substantially parallel to each of the plurality of scan lines, two fifth lines substantially having right angles with each of the plurality of scan lines, and two sixth lines each having a oblique angle with each of the plurality of scan lines, and each end of the fourth line may be connected with an end of each of the fifth lines.

In the liquid crystal display device of a delta type pixel arrangement, one of the third lines may coincide with one of the sixth lines.

Other features and advantages of the invention will be apparent from the following description of the preferred embodiments thereof.

BRIEF DESCRIPTION OF THE DRAWINGS

The present invention will be more fully understood from the following detailed explanation with reference to the accompanying drawings in which:

FIG. 1 is a plan view for explaining a configuration of a liquid crystal display device according to an embodiment of the present invention;

DETAILED DESCRIPTION OF THE PREFERRED EMBODIMENTS

The liquid crystal display device according to an embodiment of the present invention is a liquid crystal display device of a delta type pixel arrangement which comprises a plurality of scan lines (12 in FIG. 2A) formed on a substrate and extending in a horizontal direction; a plurality of signal lines (11 in FIG. 2A) intersecting the plurality of the scan lines so as to intersect substantially normal to the scan lines at the intersection region; a plurality of thin film transistors (14 in FIG. 2A) each having a drain electrode(14a in FIG. 2A) and a source electrode (14b in FIG. 2A)arranged near the intersection region of the scan line and the signal line in a direction substantially normal to the scan line; and a plurality of pixel electrodes (13 in FIG. 2A) arranged in a matrix at regions surrounded by the scan lines and the signal lines. The device is so laid out that, by forming the thin film transistor in a direction normal to the scan line and arranging a part of the signal line in a direction to cross the scan line obliquely, the auxiliary capacitance section(12a in FIG. 2A) and the opening (52 in FIG. 2A)of the pixel electrode can be increased at the same time.

An embodiment of the present invention will be explained below with reference to the drawings in order to further detail the embodiment of the present invention.

Figure 2A:
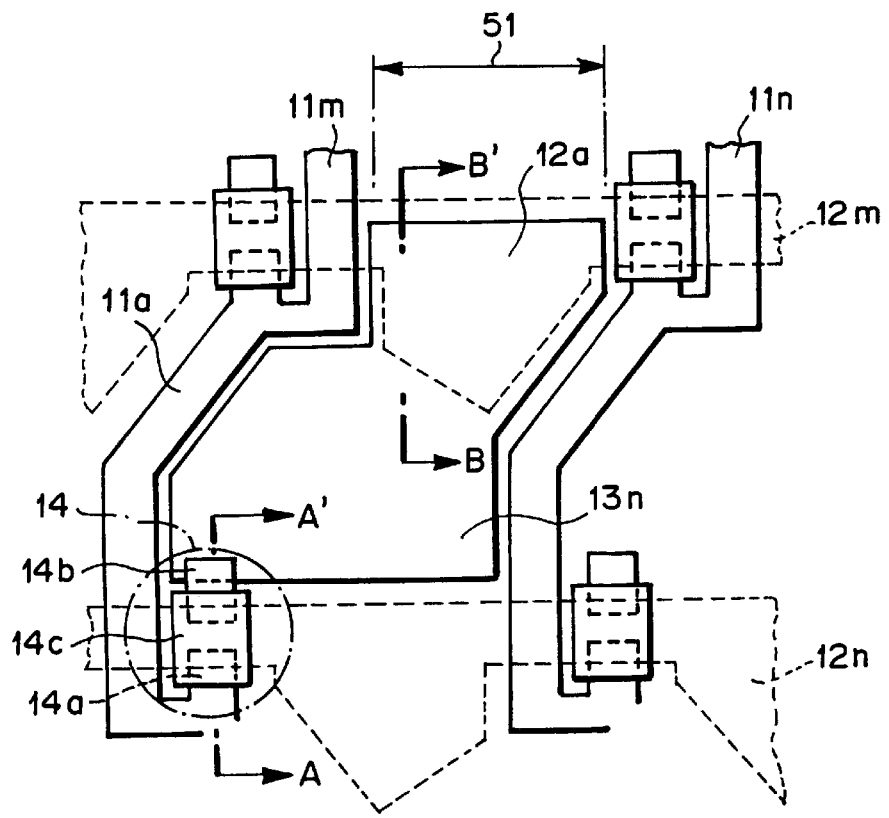
FIG. 2A is an enlarged diagram of one pixel depicted in FIG. 1.
Figure 2B:
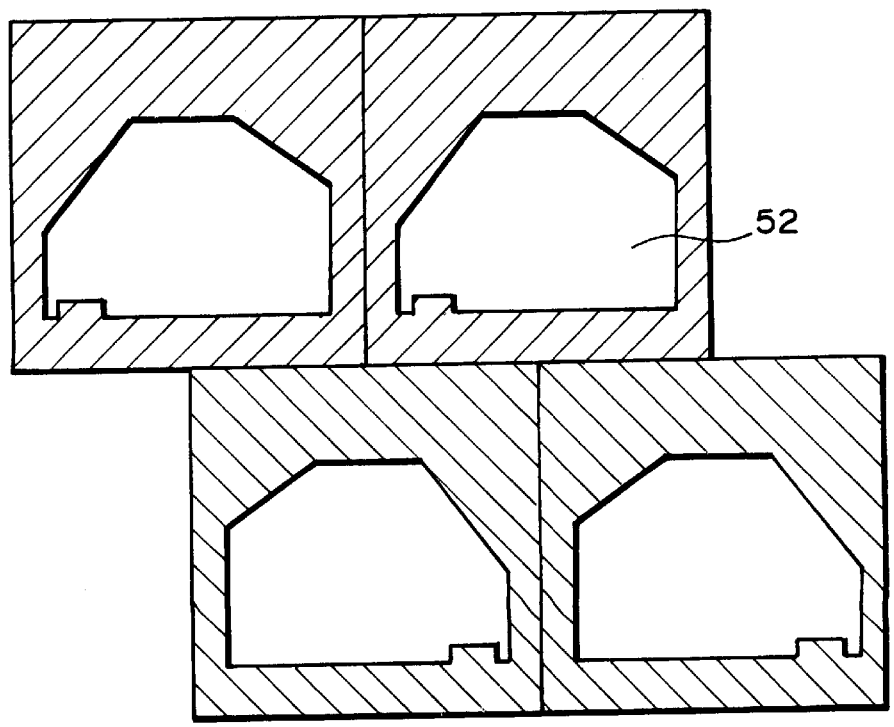
FIG. 2B is a diagram showing a shape of openings corresponding to pixels depicted in FIG. 1.
Figure 3:
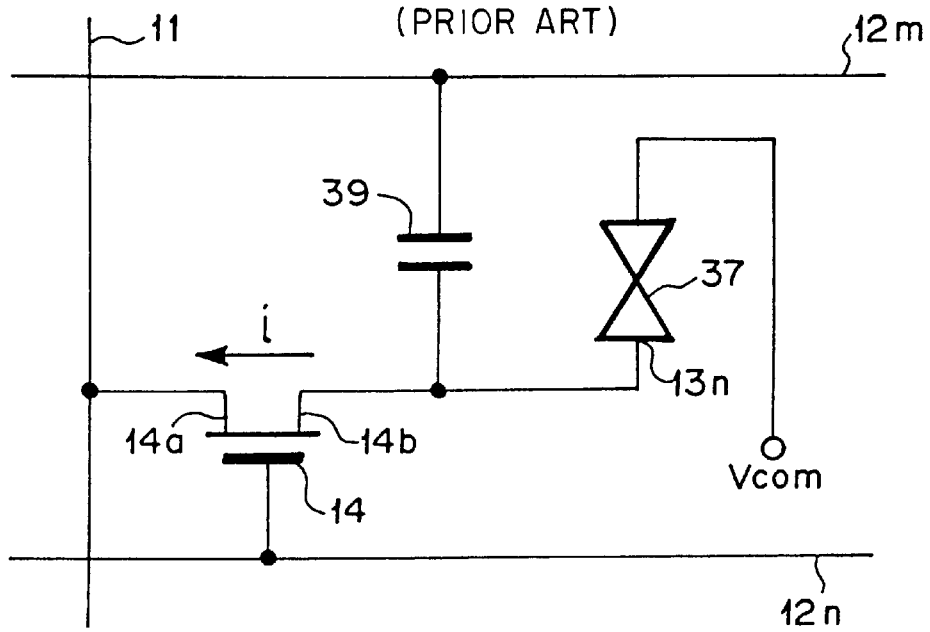
FIG. 3 is a diagram showing an equivalent circuit of the liquid crystal display device of gate storage type.
Figure 4:
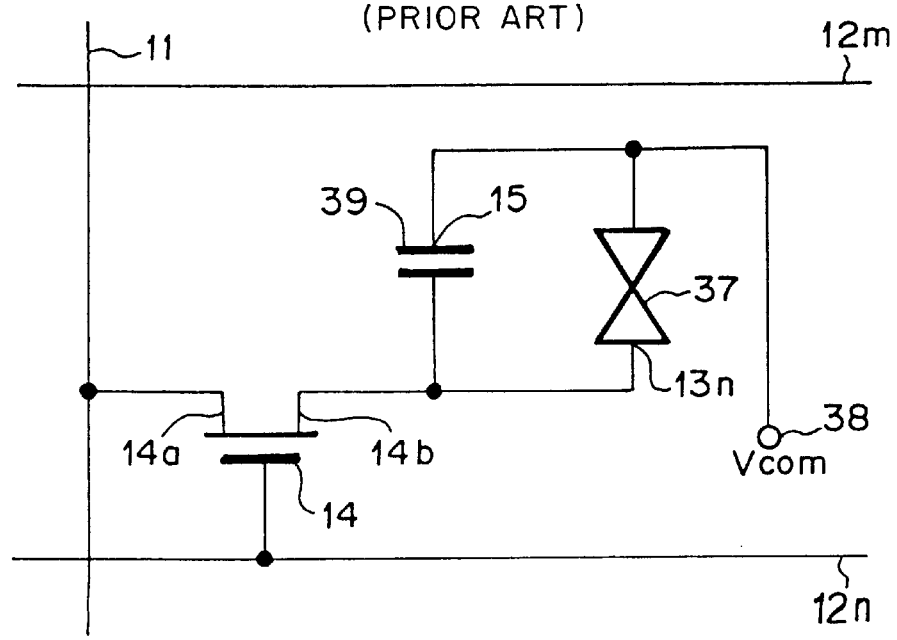
FIG. 4 is a diagram showing an equivalent circuit of the liquid crystal display device of common storage type.
Figure 7:
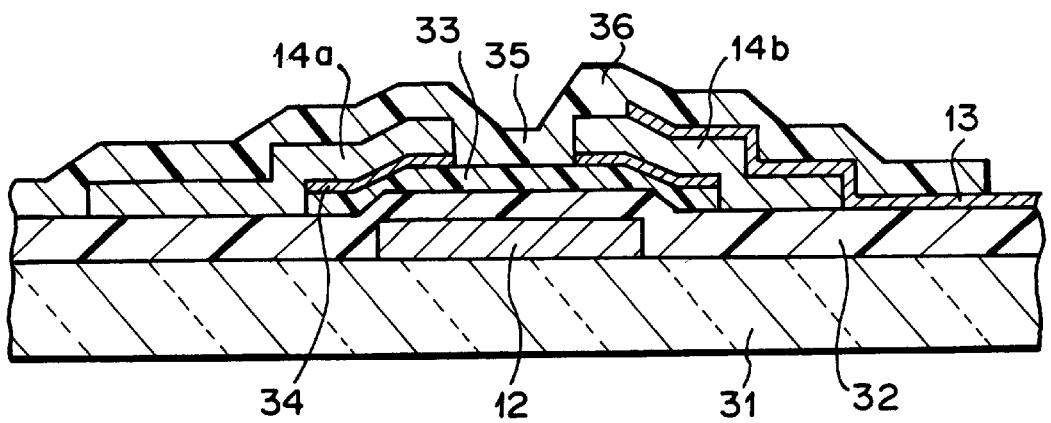
FIG. 7 is a cross sectional view for explaining the configuration of the liquid crystal display device according to the embodiment of the present invention.
Figure 8:
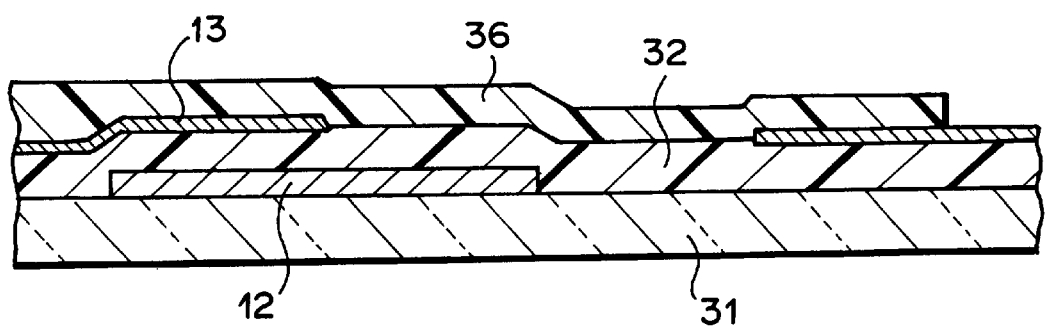
FIG. 8 is another cross sectional view for explaining the configuration of the liquid crystal display device according to the embodiment of the present invention.
Figure 9:
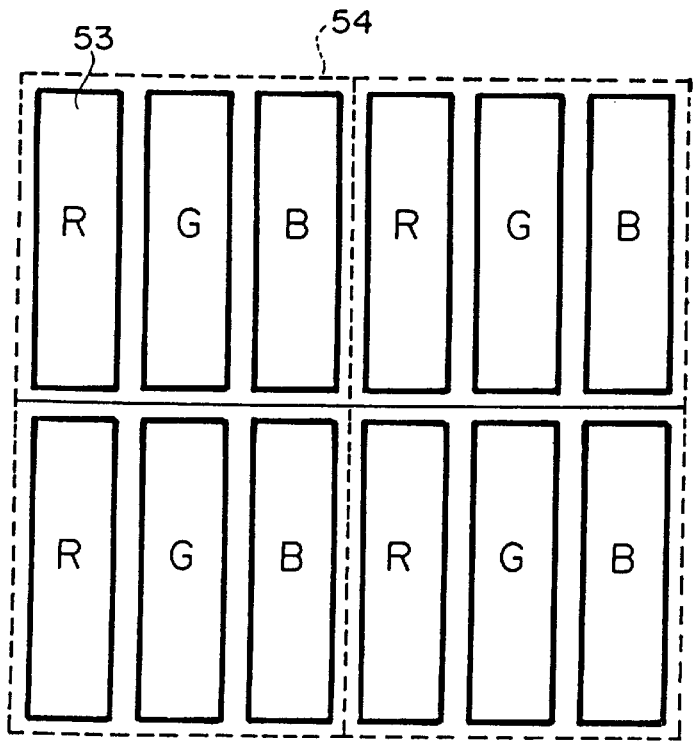
FIG. 9 is a diagram for explaining a pixel arrangement of a stripe type.
Figure 10:
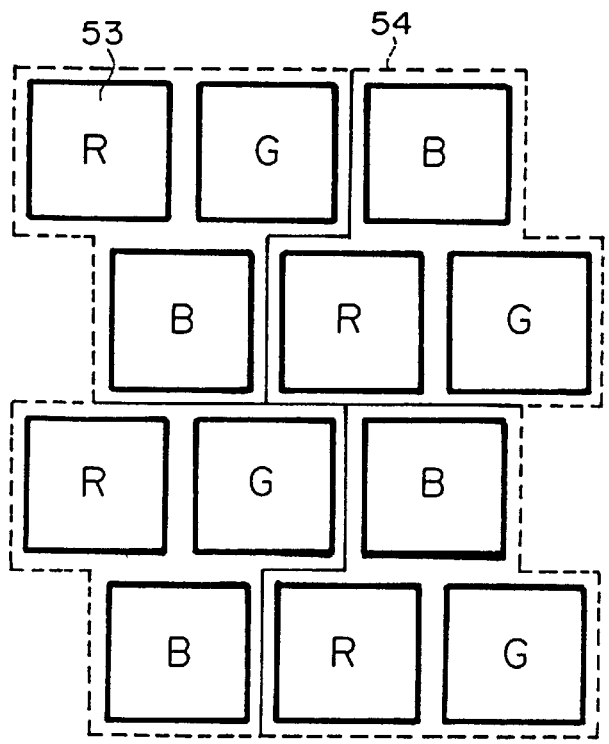
FIG. 10 is a diagram for explaining a pixel arrangement of a delta type.

The embodiment of the present invention will be explained with reference to FIGS. 1, 2A, 2B, 7 and 8. FIG. 1 is a plan view of a gate storage type liquid crystal display device of the delta type arrangement for showing an embodiment of the present invention. FIG. 2A is a plan view for enlarging one pixel electrode of FIG. 1, and FIG. 2B is a diagram showing a shape of an opening. FIG. 7 is a cross sectional view along the A–A' line in FIG. 2A, and FIG. 8 is a cross sectional view along the B–B' line in FIG. 2A.

FIGS. 1 and 2 show a TFT substrate in the liquid crystal display device which includes an opposed substrate having an opposed electrode and color layers; the TFT substrate having wires, pixel electrodes, and thin film transistors (TFTs) for driving the pixel electrodes; liquid crystal sealed therebetween; and deflective plates disposed on each of outer surfaces of the substrates.

First, the pixel arrangement will be explained with reference to FIG. 1. Pixel electrodes 13m, which are scanned by scan line 12m, are arranged linearly in a longitudinal direction of scan line 11. To the contrary, pixel electrodes 13n, which are scanned by scan line 12n in the next stage, are arranged so as to locate apart from pixel electrodes 13m by a half pitch of a pixel in the longitudinal direction of scan line 11. Explaining colors of the opposed substrate corresponding to each pixel electrode, the pixels are arranged so that the identical color pixels do not adjoin as indicated by alphabet R, G, B attached to the numeral reference 13 for the pixel electrodes.

Next, the structure of the TFT substrate will be explained with reference to FIGS. 7 and 8. The numeral reference 12 denotes a scan line formed on glass substrate 31 with a metal or another conductive material. Scan line 12 is formed so as to have a portion overlapping with pixel electrode 13 to be formed later. After forming the pattern of scan line 12, gate insulating film 32 is formed with an insulating material such as a silicon nitride.

Next, an amorphous silicon layer 33 to be a channel 14c of the transistor which is shown in FIG. 2A is formed, and then contact layer 34 for making electrical contacts between the channel and drain electrode 14a to be formed later and between the channel and source electrode 14b to be formed later is formed. Further, signal line 11 is formed with a metallic material or another conductive material. Signal line 11 is laid out so as to go round pixel electrode 13 and the pattern at detour 11a of signal line 11 is formed to oblique. Drain electrode 14a and source electrode 14b are formed simultaneously with signal line 11.

Then, pixel electrode 13 is formed with a transparent conductive material such as ITO. If leaving the structure as it is, contact layer 34 normally conducts between drain electrode 14a and source electrode 14b. Then, removing contact layer 34 located between drain electrode 14a and source electrode 14b. Further, insulating protective film 36 is formed with an insulating material such as a silicon nitride. Insulating protective film 36 is not depicted in FIGS. 1 and 2(a) for simplifying the figures.

Finally, insulating protective film 36 at undesired parts is removed to finish the TFT for the liquid crystal display device according to the embodiment of the present invention. Although the above explanation is performed on the amorphous silicon TFT of a channel etch type having a bottom gate structure, the present invention is not limited to this structure. For example, it can also be performed in an amorphous silicon TFT of a channel protective type and a polycrystalline silicon TFT. Further, it can be performed in a liquid crystal display device using a non-linear element such as the MIM as the driving element.

Figure 5A:
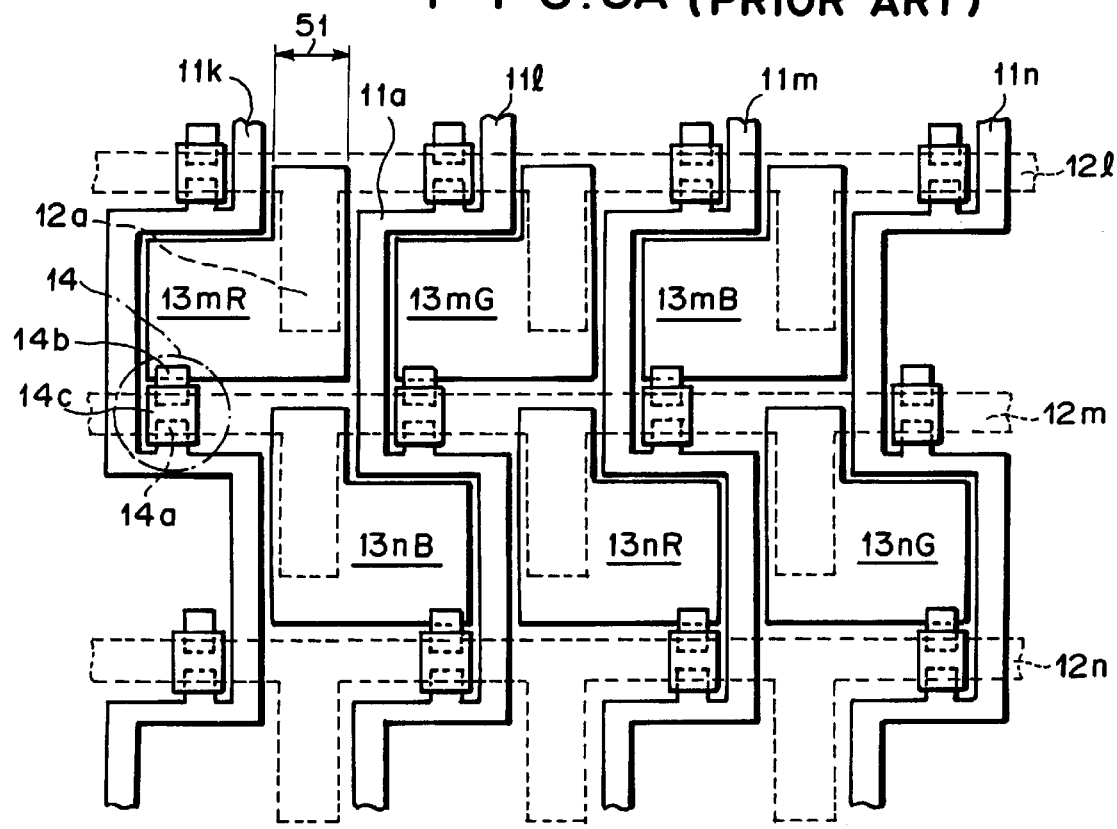
FIG. 5A is a plan view for explaining a configuration of the gate storage liquid crystal display device in the prior art.
Figure 5B:
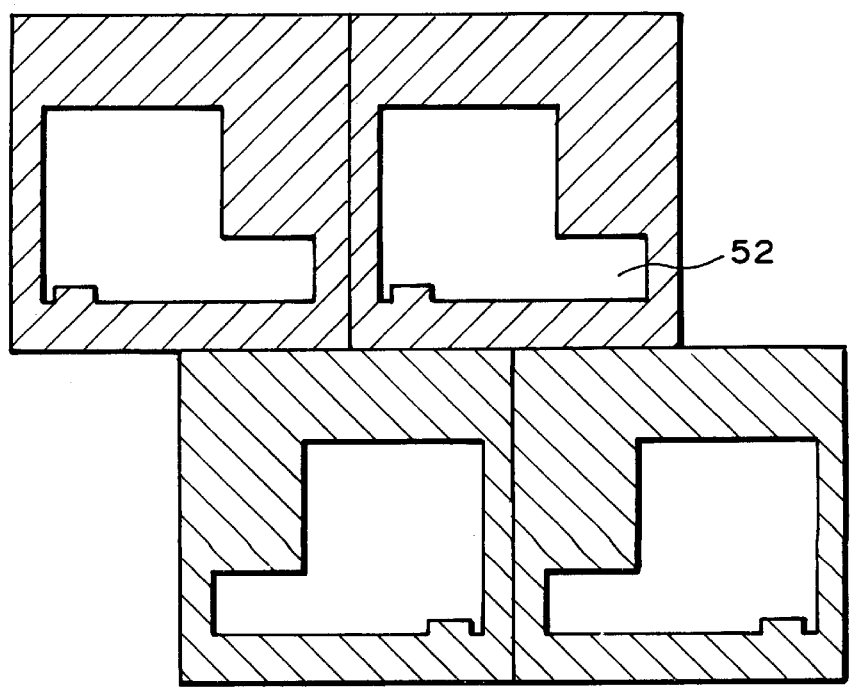
FIG. 5B is a plan view showing a shape of openings corresponding to pixels depicted in FIG. 5A.

In such the configuration, it is appreciated that a region 51 at where pixel electrode 13n adjoins pre-stage scan line 12m is particularly widened relative to the conventional gate storage type shown in FIG. 5A. Accordingly, a region for forming auxiliary capacitance section 12a necessary for driving, that is, a region at where pre-stage scan line 12m overlaps pixel electrode 13n can be sufficiently widened without disturbing the shape of pixel opening 52.

Figure 6A:
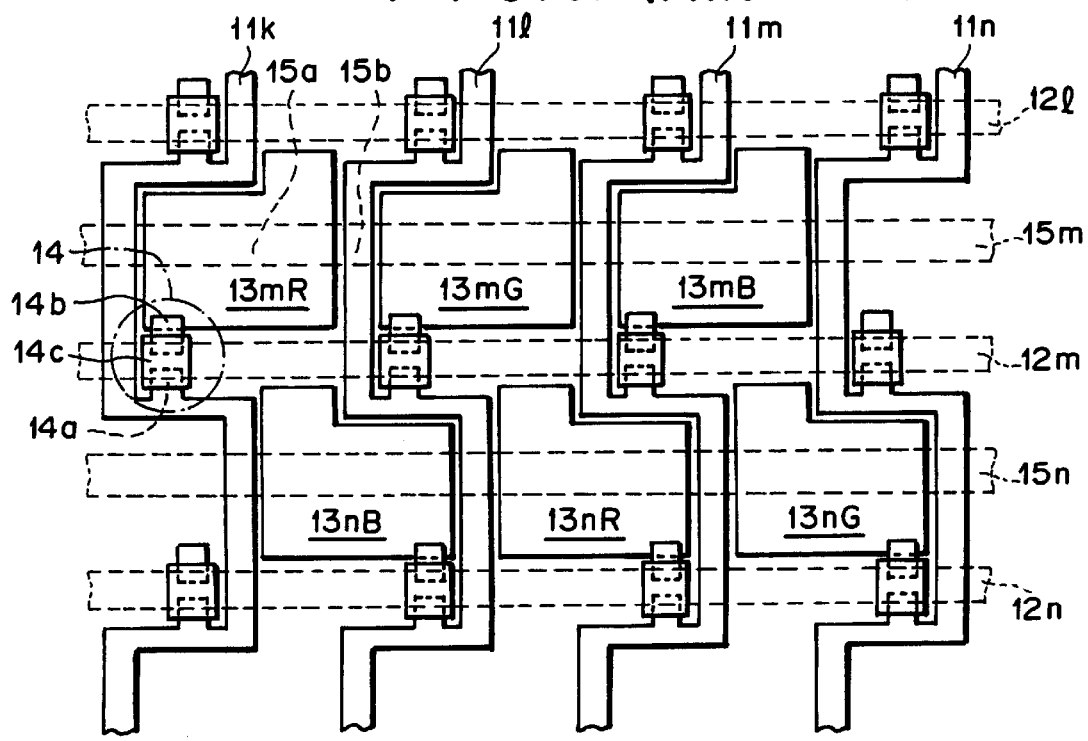
FIG. 6A is a plan view for explaining a configuration of the common storage liquid crystal display device in the prior art.
Figure 6B:
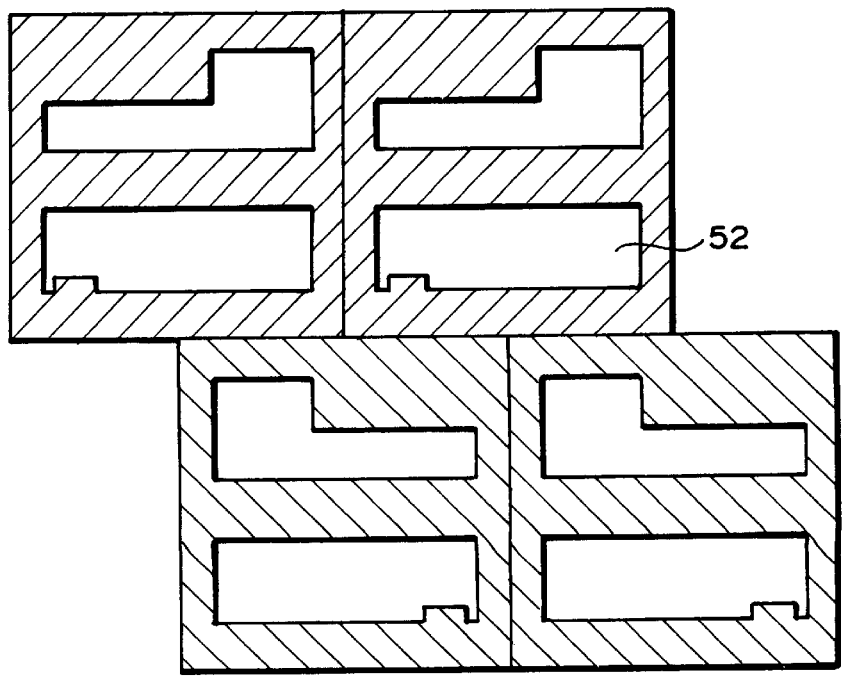
FIG. 6B is a plan view showing a shape of openings corresponding to pixels depicted in FIG. 6A.

In addition, it is also appreciated that an area of pixel opening 52 according to the embodiment of the present invention is enlarged without disturbing the shape of opening 52 by dividing opening 52 as the conventional common storage type shown in FIG. 6A.

Further, in the configuration of the embodiment of the present invention is applied, auxiliary capacitance line 15 of FIG. 6A is not present, and accordingly the load such as the electrostatic capacity at intersection region 15b between the signal line and the auxiliary capacitance line do not present at signal line 11. In addition, because signal line 11 is disposed obliquely at detour 11a of the signal line, the total wiring length of the signal line is shortened and the resistance of the signal line is reduced. By these two factors, it is possible to obtain a bright, highly contrasted and beautiful display without causing the delay of the pixel driving signal which is transmitted through signal line 11.

As explained above, the present invention has a effect to realize a pixel structure which ensures the sufficient auxiliary capacitance without disturbing the pixel opening shape, and in which the delay on a signal line is minimized and a opening rate is high.

The reason is as follows:

Namely, referring to FIGS. 1 and 2A, in the present invention, the signal line is disposed obliquely at the detour against the pixel electrode. As the result, by such the configuration, the width of the adjacent region between the pixel electrode and the pre-stage scan line can be sufficiently widened even in case of the delta type pixel arrangement. In addition, the pixel opening shape is not disturbed even if the area of the auxiliary capacitance section is enlarged to obtain the auxiliary capacitance necessary for driving.

Although the present invention has been shown and explained with respect to the preferred mode embodiments thereof, it should be understood by those skilled in the art that the foregoing and various other changes, omissions, and additions in the form and detail thereof may be made therein without departing from the spirit and scope of the present invention.

What is claimed is:

1. A liquid crystal display device of a delta type pixel arrangement, which comprises:

a plurality of scan lines formed on a substrate and extending in a horizontal direction;

a plurality of signal lines each intersection with each of said plurality of scan lines substantially at right angles at an intersection region;

a plurality of thin film transistors each having a drain electrode and a source electrode arranged at said intersection region in a direction substantially having right angles with each of said plurality of scan lines; and a plurality of pixel electrodes arranged in a matrix formed of regions divided out by said plurality of scan lines and said plurality of signal lines, wherein a part in a portion disposed between adjoining pairs of said plurality of scan lines and taken from each of said plurality of signal lines is arranged in a direction having an oblique angle with each of said plurality of scan lines, and wherein an opening of each of said pixel electrodes is defined by two first lines substantially parallel to each of said plurality of scan lines, two second lines substantially having right angles with each of said plurality of scan lines, and two third lines each having an oblique angle with each of said plurality of scan lines, and each end of one of first lines is connected with an end of each of said second lines.

2. The liquid crystal display device of a delta type pixel arrangement according to claim 1, wherein an auxiliary capacitance is formed in a section where each of said plurality of pixel electrodes overlaps each of said plurality of scan lines, said auxiliary capacitance is defined by a fourth line substantially parallel to each of said plurality of scan lines, two fifth lines substantially having right angles with each of said plurality of scan lines, and two sixth lines each having an oblique angle with each of said plurality of scan lines, and each end of said fourth line is connected with an end of each of said fifth lines.

3. The liquid crystal display device of a delta type pixel arrangement according to claim 2, wherein one of said third lines coincides with one of said sixth lines.

* * * * *

UNITED STATES PATENT AND TRADEMARK OFFICE
CERTIFICATE OF CORRECTION

PATENT NO.     : 6,172,729 B1
DATED          : January 9, 2001
INVENTOR(S)    : Munehiro Ikeda It is certified that error appears in the above-identified patent and that said Letters Patent is hereby corrected as shown below:

<u>Title page,</u>
Item [54], Title delete "LIQUID CRYSTAL DISPLAY DEVICE OF DELTA ARRANGEMENT HAVING PIXEL OPENINGS WITH SIDES OBLIQUE TO SCAN LINES" and replace with -- LIQUID CRYSTAL DISPLAY DEVICE OF DELTA TYPE PIXEL ARRANGEMENT HAVING PIXEL OPENINGS WITH SIDES OBLIQUE TO SCAN LINES --.

Signed and Sealed this

Twenty-fifth Day of March, 2003

JAMES E. ROGAN
*Director of the United States Patent and Trademark Office*